United States Patent
Buchner

(10) Patent No.: US 11,358,799 B2
(45) Date of Patent: Jun. 14, 2022

(54) DEVICE FOR ADJUSTING A GUIDE WIDTH OF A CONVEYOR

(71) Applicant: KRONES AG, Neutraubling (DE)

(72) Inventor: Christian Buchner, Koefering (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 16/886,061

(22) Filed: May 28, 2020

(65) Prior Publication Data

US 2020/0385215 A1 Dec. 10, 2020

(30) Foreign Application Priority Data

Jun. 5, 2019 (DE) .......................... 102019115195.3

(51) Int. Cl.
*B65G 21/14* (2006.01)
*B65G 21/20* (2006.01)

(52) U.S. Cl.
CPC ......... *B65G 21/2072* (2013.01); *B65G 21/14* (2013.01); *B65G 2201/0235* (2013.01); *B65G 2207/08* (2013.01); *B65G 2812/02326* (2013.01)

(58) Field of Classification Search
None
See application file for complete search history.

(56) References Cited

U.S. PATENT DOCUMENTS

| 3,647,051 A * | 3/1972 | Didas ................. | B65G 21/2072 |
| | | | 198/836.3 |
| 6,189,685 B1 * | 2/2001 | Ledingham ........ | B65G 21/2072 |
| | | | 198/836.3 |
| 6,244,429 B1 | 6/2001 | Drewitz et al. | |
| 6,464,068 B1 * | 10/2002 | Keith ..................... | B23Q 11/08 |
| | | | 104/140 |

(Continued)

FOREIGN PATENT DOCUMENTS

| CN | 108202982 A | 6/2018 |
| CN | 108584848 A | 9/2018 |

(Continued)

OTHER PUBLICATIONS

Machine Translated Abstract of DE 1244652 (1967).

(Continued)

*Primary Examiner* — Kavel Singh
(74) *Attorney, Agent, or Firm* — Caesar Rivise, PC

(57) ABSTRACT

The invention relates to an apparatus (14) for adapting a guide width (B) of a conveying device (12) for conveying containers for a container treatment installation. The apparatus (14) includes a longitudinally movable and pliable adjusting element (24), a guide element (20) for guiding the containers along a conveying direction (F) and a transmission device (26). For the adaptation of the guide width (B), the transmission device (26) is configured to convert a longitudinal movement, preferably a pushing and/or pulling movement, of the adjusting element (24) into a movement of the guide element (20) transversely with respect to the (Continued)

conveying direction (F). The pliability of the adjusting element (24) can make use possible even in curved regions of the conveying device (12). The adjusting element (24) can also be designed in a simple and cost-effective manner, for example in the form of a cable.

23 Claims, 3 Drawing Sheets

(56) References Cited

U.S. PATENT DOCUMENTS

| | | | | |
|---|---|---|---|---|
| 6,802,412 | B2* | 10/2004 | Lapeyre | B65G 47/844 |
| | | | | 198/370.02 |
| 6,827,203 | B2* | 12/2004 | Andreoli | B65G 21/2072 |
| | | | | 198/836.3 |
| 7,210,572 | B2* | 5/2007 | Ingraham | B65G 51/035 |
| | | | | 198/817 |
| 8,464,864 | B2* | 6/2013 | Bell | B65G 21/2072 |
| | | | | 198/836.3 |
| 8,613,355 | B2* | 12/2013 | Andreoli | B65G 21/2072 |
| | | | | 198/837 |
| 8,770,392 | B2 | 7/2014 | Berger et al. | |
| 9,073,698 | B2 | 7/2015 | Huettner et al. | |
| 9,731,910 | B2 | 8/2017 | Bruch | |
| 2007/0095247 | A1 | 5/2007 | Ingraham | |
| 2008/0099311 | A1 | 5/2008 | Hartness et al. | |
| 2011/0088997 | A1 | 4/2011 | Petrovic et al. | |
| 2012/0097505 | A1 | 4/2012 | Berger et al. | |
| 2019/0248590 | A1 | 8/2019 | Hsiao | |
| 2019/0322458 | A1 | 10/2019 | Schuesslburner et al. | |

FOREIGN PATENT DOCUMENTS

| | | |
|---|---|---|
| CN | 207985345 U | 10/2018 |
| DE | 1244652 B | 7/1967 |
| DE | 102013105431 A1 | 11/2014 |
| DE | 102013107038 A1 | 1/2015 |
| DE | 102018205981 A1 | 10/2019 |
| EP | 2354050 A1 | 8/2011 |
| TW | M564031 U | 7/2018 |
| WO | 2009150379 A1 | 12/2009 |

OTHER PUBLICATIONS

English Abstract of CN108202982A.
English Abstract of CN108584848A.
English Abstract of CN207985345U.

* cited by examiner

DEVICE FOR ADJUSTING A GUIDE WIDTH OF A CONVEYOR

TECHNICAL FIELD

The invention relates to an apparatus for adapting a guide width of a conveying device for conveying containers for a container treatment installation.

TECHNICAL BACKGROUND

Different embodiment variants of apparatuses for transporting containers, such as bottles or cans, in container treatment installations are already known from the prior art. During the conveying operation, the respective containers are moved and here directed along a desired transport path. To this end, there are often one or more guide elements which follow the transport path and on which the containers are guided.

Guide or directing elements of this kind can be formed, for example, by rods, metal sheets or the like. The respectively conveyed articles, during movement thereof, can be in surface contact with the guide elements and are directed by the guide elements in the tracks thereof.

If the intention is for containers with a first geometry, and subsequently or at a later point in time containers with a second geometry which differs therefrom, to pass through the transport apparatus, then it may be necessary to adapt the position of the respective guide element or elements. In such adjustment operations, the position of the guide elements has to be adapted in such a way that the distance between two guide elements is for example slightly greater than the container width or the container height, such that the containers can be guided between the respective guide elements without jamming and without tilting.

U.S. Pat. No. 8,770,392 B2 refers to a width-adjusting apparatus for a conveyor corridor. The apparatus comprises a rotatable control shaft in the form of an endless screw and a worm gear. The shaft is a pliable shaft with a large length, said shaft being in engagement with a tensioning system in order to absorb the tensile and compressive forces in the direction of rotation. To adjust a width of the conveyor corridor, the shaft is rotated.

DE 10 2013 107 038 A1 discloses a transport portion of a horizontal conveying device for conveying articles such as liquid containers or bottles, which are moved, standing or suspended on a transport support extending in a horizontal conveying direction, between two guide elements which are arranged approximately parallel at a distance which corresponds at least to the article or container width. At least one of the two oppositely arranged guide elements can be adjusted, in terms of its distance with respect to the other guide element, transversely with respect to the conveying direction by way of a plurality of adjusting elements which are anchored to a machine frame or rack. The adjusting elements are coupled to one another, and approximately synchronized, by way of a common rotary drive, wherein each adjusting element, by way of one or more transmission ratio stages, converts a rotational drive of the common rotary drive into a linear actuating movement of the guide element suspended thereon.

Disadvantages of known solutions for adapting the guide width can be a lack of flexibility, a large space requirement, high costs on account of complex systems and/or a high clarification effort.

The invention is based on the object of providing an alternative and/or improved apparatus for adapting a guide width of a conveying device.

SUMMARY OF THE INVENTION

The object is achieved by the features of independent claim 1. Advantageous developments are specified in the dependent claims and the description.

The invention provides an apparatus for adapting a guide width of a conveying device for conveying containers for a container treatment installation (for example for producing, cleaning, inspecting, filling, closing, labeling, marking and/or packaging containers for liquid media, preferably beverages or liquid foodstuffs). The apparatus comprises a longitudinally movable and pliable adjusting element (which is pliable for example by way of elastic deformation). The apparatus comprises a guide element, preferably a guide rail, for guiding the containers along a conveying direction. For the adaptation of the guide width, the guide element can expediently be movable (for example displaceable) transversely with respect to the conveying direction. The apparatus comprises a transmission device which, for the adaptation of the guide width, is configured to convert a longitudinal movement, preferably a pushing and/or pulling movement, of the adjusting element into a movement (for example displacement) of the guide element transversely with respect to the conveying direction.

The pliability of the adjusting element can make use possible even in curved regions of the conveying device. The adjusting element can be designed in a simple manner, since the setting of the conveyor width is brought about by means of a simple longitudinal movement of the adjusting element. Said adjusting element can be embodied, for example, in the form of a wire cable, with which it is for example also possible to satisfy the requirement regarding pliability in a simple manner. There is thus no need to use a complicated and expensive adjusting element, such as, for example, a rotatable shaft or similar. The apparatus can be assembled in a flexible manner and has only a small space requirement. There can furthermore be a low clarification effort. The apparatus can be easily retrofitted and can be implemented in a cost-effective manner.

It is expediently possible for the longitudinal movement of the adjusting element to be parallel to the guide element and/or to the conveying direction.

In one exemplary embodiment, the adjusting element is embodied in the form of a cable (for example formed of one or more parallel or twisted (laid) or braided wires and/or fibers), a belt, a wire, a fiber, a chain, a bar or a rod. Expediently, the adjusting element can thus be embodied in a cost-effective manner, without impairing the reliability of the apparatus.

In a further exemplary embodiment, the adjusting element is of elongate configuration and/or extends along the guide element, preferably parallel thereto. In this way, it can be made possible for the same adjusting element to be used for a plurality of spaced-apart apparatuses for adapting the guide width.

In a further exemplary embodiment, the adjusting element is longitudinally movable by motor and/or manually and/or is mounted in a non-rotatable manner.

The longitudinal movement for adjusting the adjusting element can thus be brought about differently depending on requirements.

In one embodiment, the transmission device is configured to convert the longitudinal movement of the adjusting element into a rotary movement, and to convert the rotary movement into a linear movement in order to move the guide element. Expediently, the transmission device can thus make it possible to adjust the guide width by way of only two conversions of movement.

In a further embodiment, the transmission device has a transmission ratio not equal to 1, preferably smaller than 1. Thus, it is for example possible to achieve a particularly precise setting of the conveyor width if a large longitudinal movement of the adjusting element merely leads to a small transverse movement of the guide element.

In one embodiment variant, the transmission device comprises a sliding element and a rotary element, which are in (e.g. positively locking, force-fitting and/or materially bonded) engagement with one another, for converting the longitudinal movement into the rotary movement.

Expediently, the sliding element and the rotary element can have a transmission ratio not equal to 1, preferably smaller than 1, in particular depending on a diameter of the rotary element.

In one development, the sliding element is attached to the adjusting element or integrated in the adjusting element. The attachment of the sliding element to the adjusting element can be selected in an expedient manner if the adjusting element is, for example, a cable, a wire or a fiber. The sliding element thus does not need to be present along the entire length of the adjusting element, but rather only in the relevant portion. The integration of the sliding element in the adjusting element can then, in turn, be selected in an expedient manner if the adjusting element is embodied, for example, in the form of a chain, belt, bar or rod. It is thus possible to save on the attachment step.

In a further embodiment variant, the sliding element is attached to the adjusting element by means of a clamping connection, and/or the sliding element is clamped directly to the adjusting element. The clamping connection affords a cost-effective, reliable and long-lasting connection between the sliding element and the adjusting element.

In one exemplary embodiment, the sliding element comprises a first clamping jaw and a second clamping jaw, a portion of the adjusting element being clamped in between said clamping jaws. Use can for example advantageously be made of such a construction of the sliding element if the adjusting element is a cable. The sliding element can thus be clamped to the cable in a simple manner by engaging around the cable.

In one development, one of the first clamping jaw and the second clamping jaw is in engagement with the rotary element, preferably by means of a toothing (for example toothed rack portion or toothed belt portion). This makes it possible to integrate functions, since the clamping jaw can be used both for attachment to the adjusting element and for driving the rotary element.

In a further exemplary embodiment, the transmission device comprises a guide. The sliding element and/or the adjusting element are/is longitudinally guided on the guide. As an alternative or in addition, the guide can prevent a rotation of the sliding element and/or of the adjusting element. The guide can bring about a defined longitudinal movement of the adjusting element, and therefore the rotary element is driven as desired. The guide can be used in particular in the case of an adjusting element for which there may be a risk of rotation, such as, for example, in the case of a cable.

In one embodiment, the sliding element is a (for example rigid or pliable) rod portion, preferably a toothed rack portion, and/or the rotary element is a wheel, preferably a gear wheel, particularly preferably a spur gear wheel. Particularly preferably, a toothed rack portion, for example, can thus be attached, for example clamped, to a cable in order to drive a spur gear wheel.

In a further embodiment, the sliding element is a (for example rigid or pliable) belt portion, preferably a toothed belt portion or a V-belt portion, and/or the rotary element is a roller. As an alternative, the sliding element can for example be a chain portion and/or the rotary element can be a chain wheel. The use of belts or chains can likewise make a cost-effective and reliable implementation possible.

In one embodiment variant, the transmission device comprises a screw drive for converting the rotary movement into the linear movement. The use of the screw drive can make a partial integration in the rotary element possible.

In one development, the screw drive comprises a (for example central) internally threaded hole of the rotary element. As a result, it is for example possible to save on installation space.

Expediently, the screw drive can have a transmission ratio not equal to 1, preferably smaller than 1, in particular depending on a diameter of the internally threaded hole and/or on a pitch of the thread.

In a further embodiment variant, the screw drive comprises a threaded rod which is expediently in engagement with the internally threaded hole, and therefore a rotary movement of the rotary element brings about a linear movement of the threaded rod.

In one exemplary embodiment, the guide element is attached to an end of the threaded rod. Preferably, a connecting element, which is connected to the threaded rod in a rotationally fixed manner, and a further connecting element (for example a flat bar), which is connected to the guide element in a fixed manner, can be connected to one another, particularly preferably can be screwed to one another. It is thus possible to attach the guide element to an end of the threaded rod in a simple and reliable manner.

The invention also relates to an apparatus for transporting containers for a container treatment installation (for example for producing, cleaning, inspecting, filling, closing, labeling, marking and/or packaging containers for liquid media, preferably beverages or liquid foodstuffs). The apparatus comprises a conveying device with a conveying element, preferably a conveyor belt, for conveying the containers (for example in a standing or suspended state). The apparatus further comprises a plurality of apparatuses for adapting a guide width as disclosed herein, said apparatuses being arranged along one longitudinal outer side or along both longitudinal outer sides of the conveying device, wherein the apparatuses arranged on the same longitudinal outer side each share the adjusting element. The plurality of apparatuses are preferably attached in a rotationally secure and/or height-adjustable manner.

The preferred embodiments and features of the invention described above can be combined with one another as desired.

BRIEF DESCRIPTION OF THE FIGURES

Further details and advantages of the invention are described below with reference to the attached drawings. In the drawings.

The embodiments shown in the figures correspond at least in part, such that similar or identical parts are provided with the same reference designations, and for the explanation thereof reference is also made to the description of the other embodiments or figures in order to avoid repetitions.

DETAILED DESCRIPTION OF EXEMPLARY EMBODIMENTS

Figure 1:
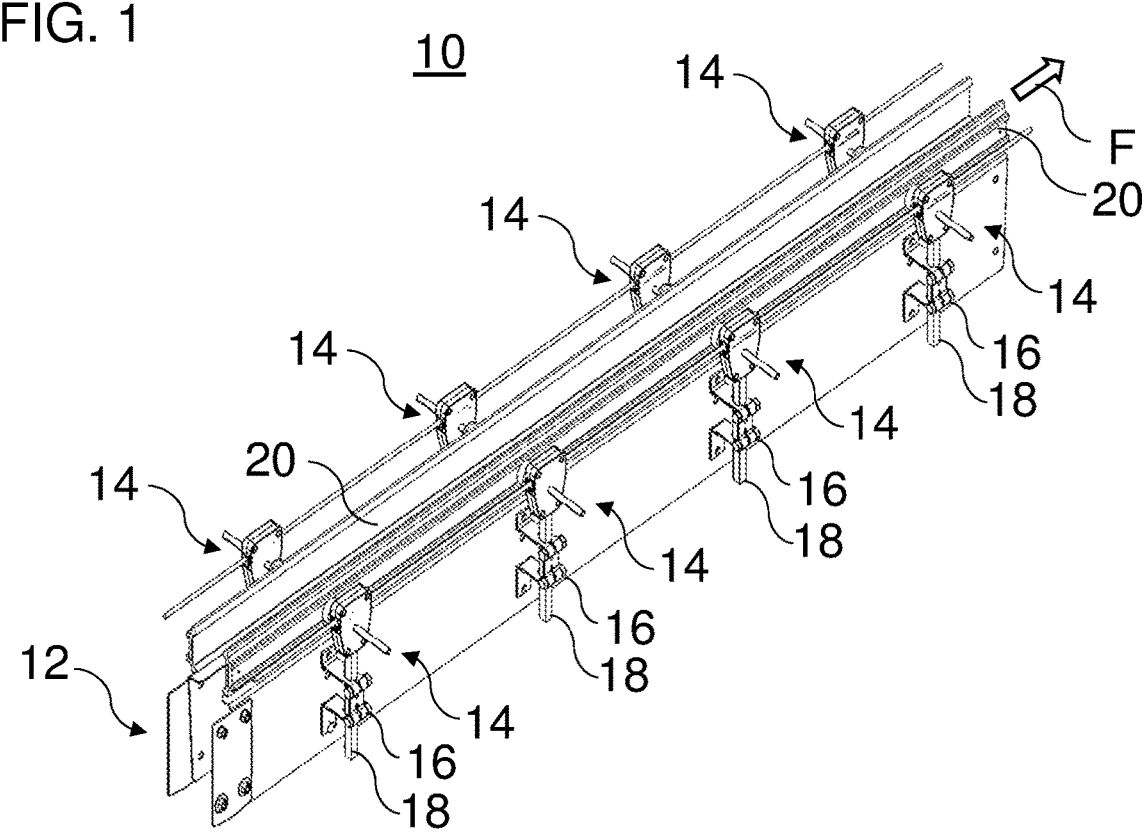
FIG. 1 shows a perspective view of an apparatus for transporting containers according to one exemplary embodiment of the present disclosure.
Figure 2:
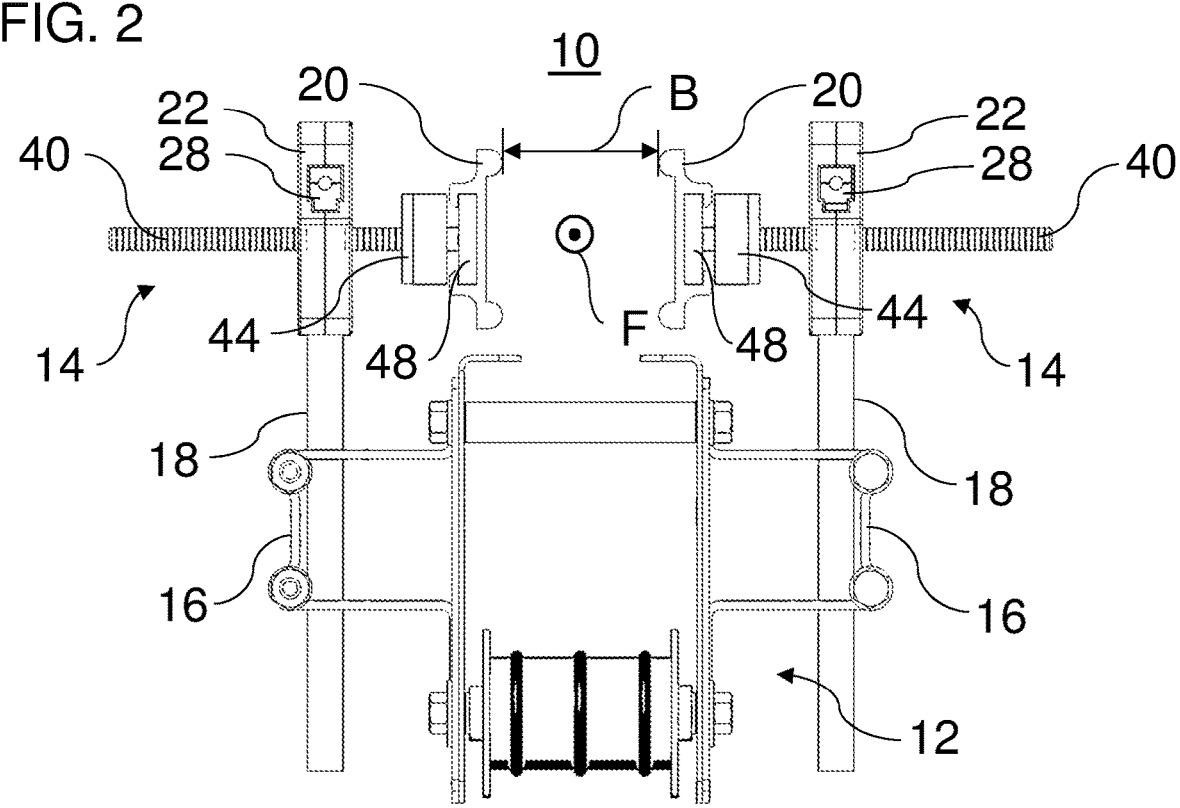
FIG. 2 shows a front view of the exemplary apparatus for transporting containers.

FIGS. 1 and 2 show an apparatus 10 for transporting articles or containers (not illustrated), for example bottles or cans. The apparatus 10 can expediently be comprised in a container treatment installation for producing, cleaning, inspecting, filling, closing, labeling, marking and/or packaging containers, preferably for beverages or liquid foodstuffs.

The apparatus 10 comprises a conveying device 12 and a plurality of apparatuses 14 for changing a guide width B (see FIG. 2) for the conveying device 12.

The conveying device 12 can comprise a transport support on which containers can for example be conveyed in a standing state. The conveying device 12 conveys the containers in a conveying direction F (see arrow in FIGS. 1 and 2). By way of example, the conveying device 12 can comprise a circulating conveyor belt (not illustrated), on which the containers can be conveyed. In order to be able to convey containers of differing size with the same conveying device 12, in particular in a single-track manner and/or with reduced risk of tilting, it is possible to adjust the guide width B of the conveying device 12 by means of the apparatuses 14. The guide width B extends between mutually opposite guide elements 20 of the apparatuses 14.

A respective plurality of apparatuses 14 are arranged on both longitudinal outer sides of the conveying device 12. Expediently, the plurality of apparatuses 14 are fastened to the two longitudinal outer sides of the conveying device 12. The apparatuses 14 can be fastened to the conveying device 12 such that they cannot rotate. By way of example, the apparatuses 14 are each fastened to one of the longitudinal outer sides of the conveying device 12 by means of a mount 16. The mount 16 retains a respective bar-like or tubular body 18 in a rotationally fixed manner. Expediently, the mounts 16 clamp the bodies 18. Prior to the clamping, the bodies 18 can be positioned freely with respect to the mounts 16. The apparatuses 14 are thus fastened to the conveying device 12 in a height-adjustable manner. The bodies 18 are connected to the apparatuses 14 in a rotationally fixed manner. Expediently, the bodies 18 can be embodied in the form of multi-sided bodies, for example in the form of four-sided bodies, as illustrated.

The rotationally secure fastening can thus be realized in a simple manner. It is for example also possible for the plurality of apparatuses 14 to be fastened in some other way, preferably in a rotationally secure manner, and/or to be arranged only on one of the two longitudinal outer sides of the conveying device 12.

Figure 3:
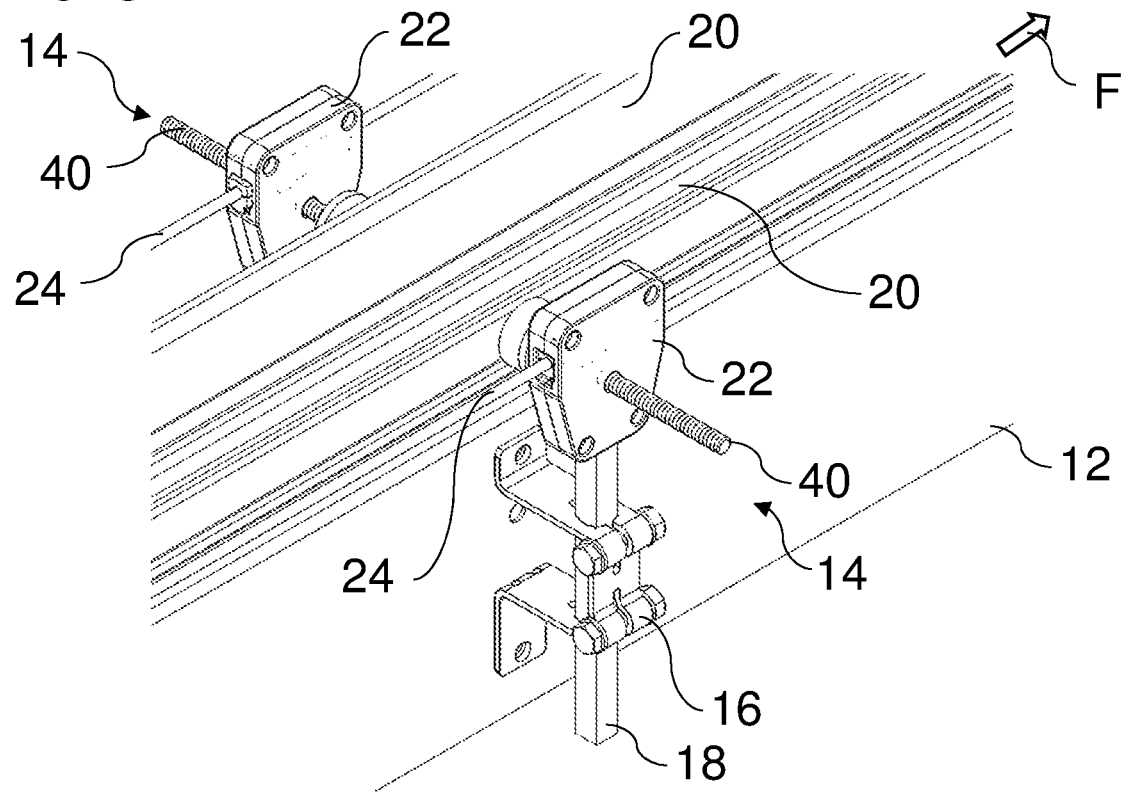
FIG. 3 shows a perspective view of an apparatus for changing a guide width of a conveying device for conveying containers according to one exemplary embodiment of the present disclosure.
Figure 4:
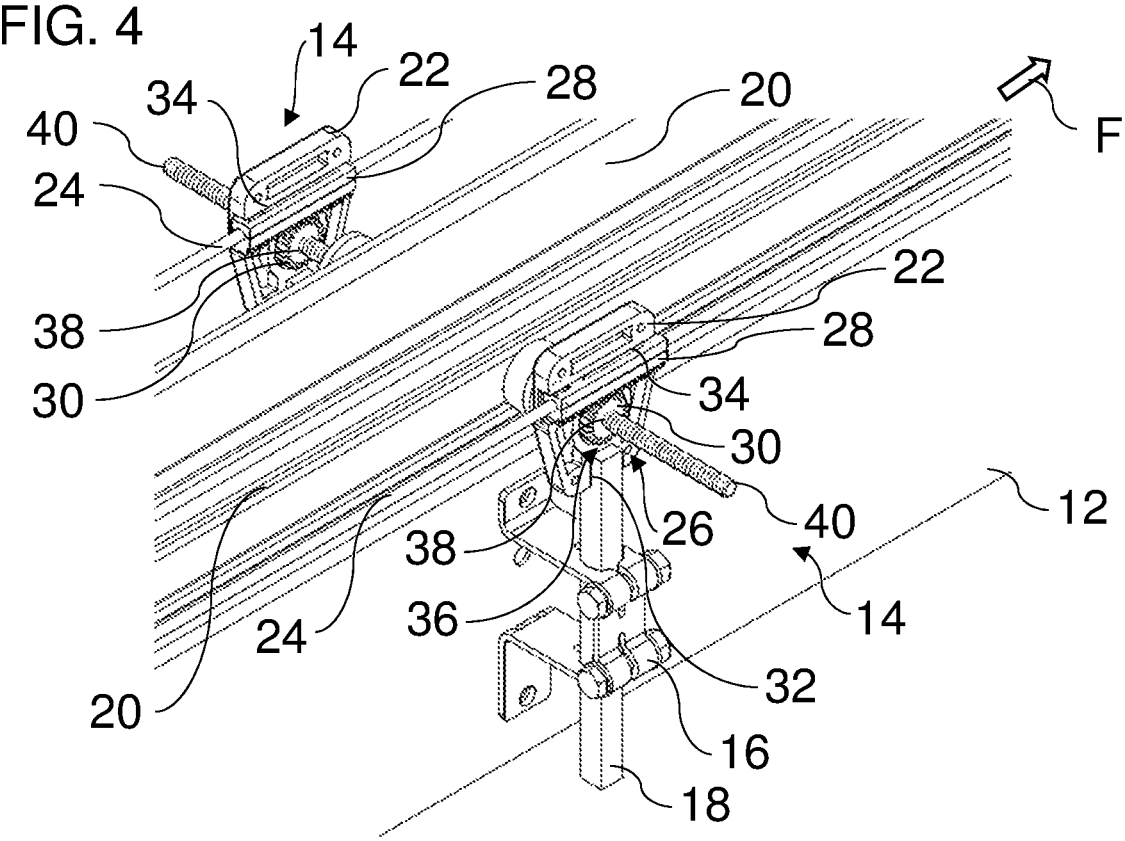
FIG. 4 shows a perspective view of the exemplary apparatus for changing the guide width, with partially open housing.

FIGS. 3 and 4 show the apparatuses 14 in greater detail. To illustrate a configuration, a housing 22 of the apparatus 14 is open in FIG. 4.

The apparatus 14 comprises an adjusting element 24, a transmission device 26 and the guide element 20. The apparatuses 14 on a respective one of the longitudinal outer sides of the conveying device 12 can jointly share a respective adjusting element 24 and at least partially share a respective guide element 20.

For the adjustment of the guide width B (see FIG. 2), the apparatus 14 is configured to convert a longitudinal movement of the adjusting element 24 into a transverse movement of the guide element 20 by means of the transmission device 26.

Specifically, the apparatus 14 can initially convert the longitudinal movement of the adjusting element 24 into a rotary movement. The rotary movement, in turn, can be converted into a linear movement for displacing the guide element 20.

The adjusting element 24 can be of elongate, preferably bar-like or rod-like, embodiment. The adjusting element 24 can extend along the conveying device 12, for example substantially parallel thereto. The adjusting element 24 is of pliable embodiment, preferably in the form of a pliable cable, for example a pliable wire cable, as illustrated. The pliable cable can be formed, for example, of a plurality of parallel, twisted/laid or braided wires or fibers. An advantage of using the pliable adjusting element 24 is that the apparatus 14 can also be used along curves of the conveying device 12. It is possible that, instead of a pliable cable, use can for example be made of a pliable belt (for example an endless belt), a single pliable wire, a single pliable fiber, a chain, a pliable bar, a pliable rod, etc.

A longitudinal movement of the adjusting element 24 can be brought about by motor or by hand. The longitudinal movement can be a pushing and/or pulling movement depending on the configuration of the adjusting element 24. The longitudinal movement of the adjusting element 24 can be effected for example by rolling up at one side, for example in the case of a cable, a wire, a fiber, a belt or a chain. A longitudinal displacement of the adjusting element 24 can likewise be effected for example by a circulating drive, for example in the case of an endless belt or an endless chain, or by a linear drive, for example in the case of a bar or a rod.

The adjusting element 24 is in engagement with the transmission device 26 by way of a sliding element 28. Specifically, the sliding element 28 can be in engagement with a rotary element 30 of the transmission device 26. The engagement is such that a longitudinal movement of the sliding element 28 leads to a rotary movement of the rotary element 30.

As illustrated, the sliding element 28 can be attached to the adjusting element 24. By way of example, the sliding element 28 can be clamped to the adjusting element 24. The sliding element 28 can comprise two clamping jaws, which can clamp a portion of the adjusting element 24 in between them. Alternative or additional types of attachment are also possible, for example screw connection, adhesive connection, latching connection, etc. It is also possible for the sliding element 28 to be integrated in a portion of the adjusting element 24. By way of example, the adjusting element 24 can be embodied in the form of a toothed belt and the sliding element 28 can be embodied in the form of a toothed belt portion of the toothed belt. It is for example also possible for the adjusting element 24 to be embodied in the form of a chain and for the sliding element 28 to be embodied in the form of a chain portion of the chain.

As also illustrated, the sliding element 28 can be embodied in the form of a toothed rack portion and the rotary element 30 can be embodied in the form of a gear wheel, in particular a spur gear wheel. The toothed rack portion meshes with the gear wheel. A longitudinal movement/displacement movement of the toothed rack portion leads to a rotary movement of the gear wheel. By way of example, the toothed rack portion can be formed by one of the clamping jaws of the sliding element 28. It is also possible for other pairings to be used for the sliding element 28 and the rotary element 30 in order to convert a longitudinal movement of the sliding element 28 into a rotary movement of the rotary element 30. By way of example, the sliding element 28 can be a chain portion and the rotary element 30 can be a chain wheel. The sliding element 28 can also be cable portion, a belt portion (for example a V-belt portion or a toothed belt portion), a for example profiled bar or rod portion, and the rotary element 30 can be a driven roller.

The apparatus 14 can comprise the housing 22. The sliding element 28 and the rotary element 30 can be accommodated in the housing 22. The sliding element 28 can be mounted in the housing 22 so as to be longitudinally displaceable by a guide 34. The guide 34 can be formed for example by one or more housing walls of the housing 22. The guide 34 can further be configured to prevent a rotation of the sliding element 28, that is to say a rotation of the sliding element 28 about its longitudinal axis, if desired. The rotary element 30 can be mounted in the housing 22 in a rotatable manner. At a lower end of the housing 22, the bar-like or tubular body 18 can be connected to the housing 22 in a rotationally fixed manner, for example by a multi-sided receptacle 32 in the housing 22. The housing 22 can for example comprise two housing halves which can be fastened to one another, as illustrated in the figures. To illustrate an internal configuration of the apparatus 14, one of the two housing halves is omitted in FIG. 4.

The apparatus 14 can further comprise a screw drive 36. By means of the screw drive 36, a rotary movement of the rotary element 30 can be converted into a linear movement. The screw drive 36 comprises a central internally threaded hole 38 in the rotary element 30. The screw drive 36 also comprises a threaded rod 40. The threaded rod 40 is in engagement with the internally threaded hole 38. The guide element 20 is attached to an end of the threaded rod 40. The guide element 20 is preferably borne by the threaded rod 40. The threaded rod 40 is retained on the guide element 20 in a rotationally fixed manner. A rotary movement of the rotary element 30 and thus of the internally threaded hole 38 therefore leads to a linear movement of the threaded rod 40 transversely with respect to the conveying direction F of the conveying device 12. The linear movement of the threaded rod 40 leads to a transverse movement of the guide element 20 in order to set the guide width B (see FIG. 2).

As a result of an adaptation of the pitch of the threads and of a diameter of the internally threaded hole 38 and of the threaded rod 40, it is possible to predetermine a desired transmission ratio for the screw drive 36 and thus the transmission device 26. The transmission ratio can further be influenced by a diameter of the rotary element 30. By way of example, the transmission device 26 can be embodied such that a comparatively large longitudinal movement of the adjusting element 24 leads to a comparatively small transverse movement of the threaded rod 40 in order to, for example, be able to very precisely set a desired guide width B (see FIG. 2). Preferably, the transmission device 26 can have a transmission ratio smaller than 1, that is to say an extent of the longitudinal movement of the adjusting element 24 is larger than an extent in the resulting linear movement of the threaded rod 40 or of the guide element 20.

Figure 5:
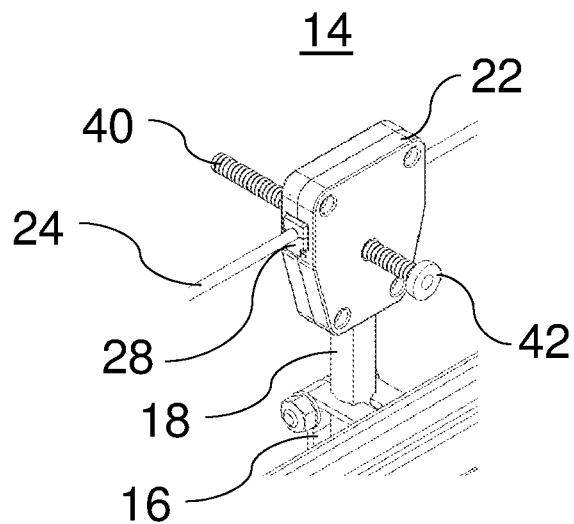
FIGS. 5-7 show perspective views of the exemplary apparatus for changing the guide width, said views showing a construction of a connecting component for attachment to a guide element of the apparatus for changing the guide width.
Figure 6:
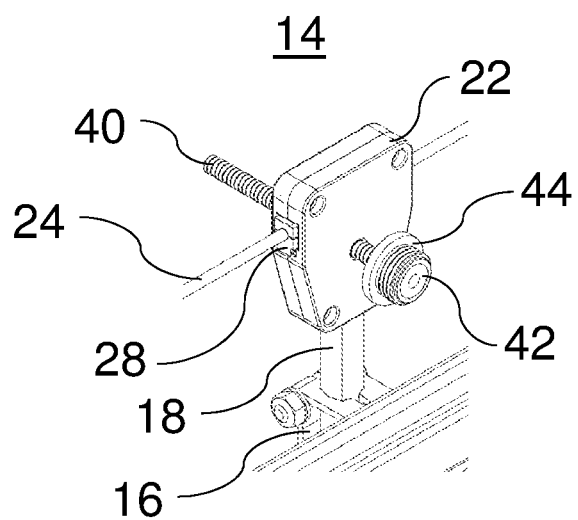
Figure 7:
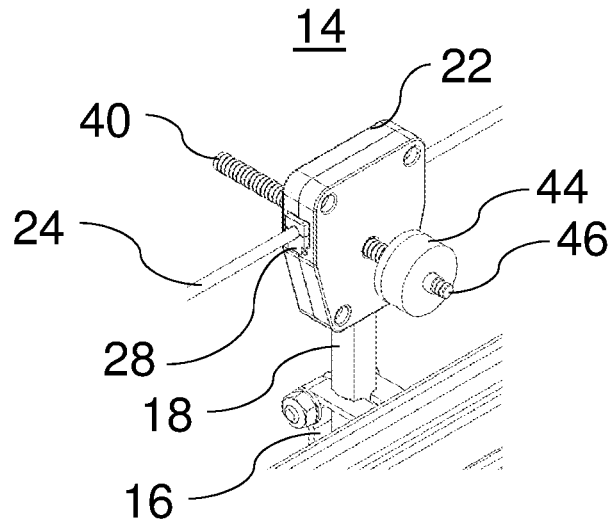

FIGS. 5 to 7 show an exemplary construction of a connection of the threaded rod 40 and of the guide element 20. At an end which faces toward the guide element 20, a connecting element 42, for example in the form of a bearing inner ring, can be fastened on the threaded rod 40. It is possible for an expediently two-part fastening element 44 to be fixedly plugged onto the connecting element 42, or adhesively bonded, or similar, thereto. The individual parts of the fastening element 44 can for example be screwed to one another, as illustrated. The fastening element 44 can in turn comprise a fastening portion 46, for example in the form of a threaded rod. A further connecting element 48 (see FIG. 2), for example a flat bar, for connection to the guide element 20 can be fastened to the fastening portion 46. The further connecting element 48 can be accommodated, for example, in a receptacle of the guide element 20 (see also FIG. 2).

The invention is not restricted to the preferred exemplary embodiments described above. In fact, numerous variants and modifications are possible which likewise make use of the concept of the invention and therefore fall within the scope of protection. In particular, the invention also claims protection for the subject matter and the features of the subclaims independently of the claims referred back to. In particular, the individual features of independent claim 1 are each disclosed independently of one another. Furthermore, the features of the subclaims are also disclosed independently of all of the features of independent claim 1, and for example independently of the features relating to the presence and/or the configuration of the adjusting element, of the guide element and/or of the transmission device of independent claim 1.

LIST OF REFERENCE DESIGNATIONS

10 Apparatus for transporting containers
12 Conveying device
14 Apparatus for changing a guide width
16 Mount
18 Bar-like or tubular body
20 Guide element
22 Housing
24 Adjusting element
26 Transmission device
28 Sliding element
30 Rotary element
32 Receptacle
34 Guide
36 Screw drive
38 Internally threaded hole
40 Threaded rod
42 Connecting element
44 Fastening element
46 Fastening portion
48 Further connecting element
F Conveying direction
B Guide width

The invention claimed is:

1. An apparatus for adapting a guide width of a conveying device for conveying containers for a container treatment installation, comprising:

a longitudinally movable and bendable adjusting element;
a guide element for guiding the containers along a conveying direction; and
a transmission device which, for the adaptation of the guide width, is configured to convert a longitudinal movement of the adjusting element into a movement of the guide element transversely with respect to the conveying direction, the transmission device further configured to convert the longitudinal movement of the adjusting element into a rotary movement, and to convert the rotary movement into a linear movement in order to move the guide element.

2. The apparatus according to claim 1, wherein:
the adjusting element is embodied in the form of a cable, a belt, a wire, a fiber, a chain, a bar or a rod;
the adjusting element is of elongate configuration and/or extends along the guide element; and/or
the adjusting element is longitudinally movable by motor and/or manually; and/or
the adjusting element is mounted in a non-rotatable manner.

3. The apparatus according to claim 2, wherein the adjusting element extends along the guide element and is parallel thereto.

4. The apparatus according to claim 1, wherein:
the transmission device has a transmission ratio between the longitudinal movement and the linear movement not equal to 1.

5. The apparatus according to claim 4, wherein the transmission device comprises a sliding element and a rotary element, which are in direct engagement with one another, for converting the longitudinal movement into the rotary movement.

6. The apparatus according to claim 5, wherein:
the sliding element is attached to the adjusting element, or
the sliding element is integrated in the adjusting element.

7. The apparatus according to claim 5, wherein:
the sliding element is attached to the adjusting element by way of a clamping connection, and/or
the sliding element is clamped directly to the adjusting element.

8. The apparatus according to claim 5, wherein the sliding element comprises a first clamping jaw and a second clamping jaw, a portion of the adjusting element being clamped in between said clamping jaws.

9. The apparatus according to claim 8, wherein one of the first clamping jaw and the second clamping jaw is in engagement with the rotary element.

10. The apparatus according to claim 8, wherein one of the first clamping jaw and the second clamping jaw is in engagement with the rotary element by way of a toothing.

11. The apparatus according to claim 5, wherein the transmission device comprises a guide, wherein:
the sliding element and/or the adjusting element are/is longitudinally guided on the guide; and/or
the guide prevents a rotation of the sliding element and/or of the adjusting element.

12. The apparatus according to claim 5, wherein:
the sliding element is a rod portion, and the rotary element is a wheel; or
the sliding element is a belt portion, and the rotary element is a roller; or
the sliding element is a chain portion and the rotary element is a chain wheel.

13. The apparatus according to claim 12, wherein:
the sliding element is a toothed rack portion and the rotary element is a spur gear wheel; or
the sliding element is a toothed belt portion or a V-belt portion, and the rotary element is a roller.

14. The apparatus according to claim 4, wherein the transmission device comprises a screw drive for converting the rotary movement into the linear movement.

15. The apparatus according to claim 14, wherein the screw drive comprises an internally threaded hole of the rotary element.

16. The apparatus according to claim 14, wherein:
the screw drive comprises a threaded rod which is in engagement with the internally threaded hole, so that a rotary movement of the rotary element brings about a linear movement of the threaded rod.

17. The apparatus according to claim 16, wherein the guide element is attached to an end of the threaded rod.

18. The apparatus according to claim 17, wherein a connecting element, which is connected to the threaded rod in a rotationally fixed manner, and a further connecting element, which is connected to the guide element in a fixed manner, are connected to one another.

19. The apparatus according to claim 4, wherein the transmission ratio is less than 1.

20. The apparatus according to claim 1, wherein the guide element is a guide rail and the longitudinal movement of the transmission device is at least one of a pushing movement and a pulling movement.

21. The apparatus according to claim 1, wherein the transmission device further configured to initially convert the longitudinal movement of the adjusting element into the rotary movement, and to convert said rotary movement that was converted from the longitudinal movement into the linear movement in order to move the guide element.

22. An apparatus for transporting containers for a container treatment installation, comprising:
a conveying device with a conveying element for conveying the containers; and
a plurality of apparatuses for adapting a guide width of the conveying device, each of the plurality of apparatuses including a longitudinally movable and bendable adjusting element, a guide element for guiding the containers along a conveying direction, and a transmission device which, for the adaptation of the guide width, is configured to convert a longitudinal movement of the adjusting element into a movement of the guide element transversely with respect to the conveying direction, the transmission device further configured to convert the longitudinal movement of the adjusting element into a rotary movement, and to convert the rotary movement into a linear movement in order to move the guide element, said apparatuses being arranged along one longitudinal outer side or along both longitudinal outer sides of the conveying device, wherein the apparatuses arranged on the same longitudinal outer side each share the adjusting element.

23. The apparatus according to claim 22, wherein the conveying device is a conveyor belt and the apparatuses are attached in a rotationally secure and/or height-adjustable manner.

* * * * *